Dec. 12, 1933. C. M. TERRY 1,938,943
VALVE
Filed April 13, 1931 4 Sheets-Sheet 2

INVENTOR
CHARLES M. TERRY
BY
Albert G. Blodgett
ATTORNEY

INVENTOR
CHARLES M. TERRY
BY
Albert G. Blodgett
ATTORNEY

Patented Dec. 12, 1933

1,938,943

UNITED STATES PATENT OFFICE 1,938,943

VALVE

Charles M. Terry, Decatur, Ill., assignor to A. W. Cash Company, Decatur, Ill., a corporation of Delaware Application April 13, 1931. Serial No. 529,739

3 Claims. (Cl. 50—23)

This invention relates to valves, and more particularly to fluid flow controlling valves which are actuated automatically by the pressure of the fluid and which serve to maintain desired fluid pressure conditions.

Valves of this general type are frequently used in refrigerating systems to control the flow of the circulating fluid, which is usually ammonia. In such a system, it is desirable to maintain a comparatively slight pressure drop through the valve, although a high rate of flow is ordinarily required. These conditions necessitate a valve having a large port area, and it has heretofore been difficult to provide a sufficient port area without excessive valve movement, which is often undesirable, particularly when the valve is actuated by a flexible diaphragm subject to the fluid pressure. This same problem is frequently encountered in other fields.

It is accordingly one object of the present invention to provide a flow controlling valve which will make possible a large port area with slight valve travel, and particularly to provide such a valve which will be automatically controlled by the pressure of the fluid.

A further object of the invention is to provide a valve which may be easily and cheaply constructed which is so arranged that a slight movement of the flow controlling member will produce a very large change in the area available for flow.

A further object is to provide an automatically actuated valve which is free from all stuffing boxes and which is perfectly balanced against the fluid pressure so that it will respond instantly to the slightest change in fluid pressure and work freely at all times without sticking.

With these and other objects in view, as will be apparent to those skilled in the art, my invention resides in the combination of parts set forth in the specification and covered by the claims appended hereto.

In accordance with my invention I provide two relatively slidable coaxial cylindrical members, each having a series of axially spaced ports. The ports of one member may be brought into or out of register with the ports of the other member. The ports may be shaped as parallel slots extending circumferentially of the members. In the preferred embodiment of the invention, I provide a series of coaxial rings which are spaced axially to provide annular ports, and these rings are held together by a supporting means, such as a thin web or ribs, located inside of and preferably integral with the rings. In order to control the flow through the ports, I mount a second series of coaxial rings on the outside of the first series. The rings of the second series are likewise spaced axially to provide annular ports, and they are held together by a supporting means, such as a plurality of longitudinal ribs, outside of and preferably integral with the rings. The two series of rings are relatively slidable axially to bring the ports of one series into or out of register with the ports of the other series. A suitable valve body is provided to form conduits for fluid leading to and from the ports. The rings are preferably moved automatically by means of the fluid pressure, for example by utilizing a spring loaded flexible diaphragm exposed to the pressure, or by the direct pressure of the fluid on the valve structure itself.

Referring to the drawings illustrating certain embodiments of the invention, and in which like reference numerals indicate like parts, Fig. 1 is a section through a valve arranged to maintain automatically a substantially constant inlet pressure;

Figure 1:
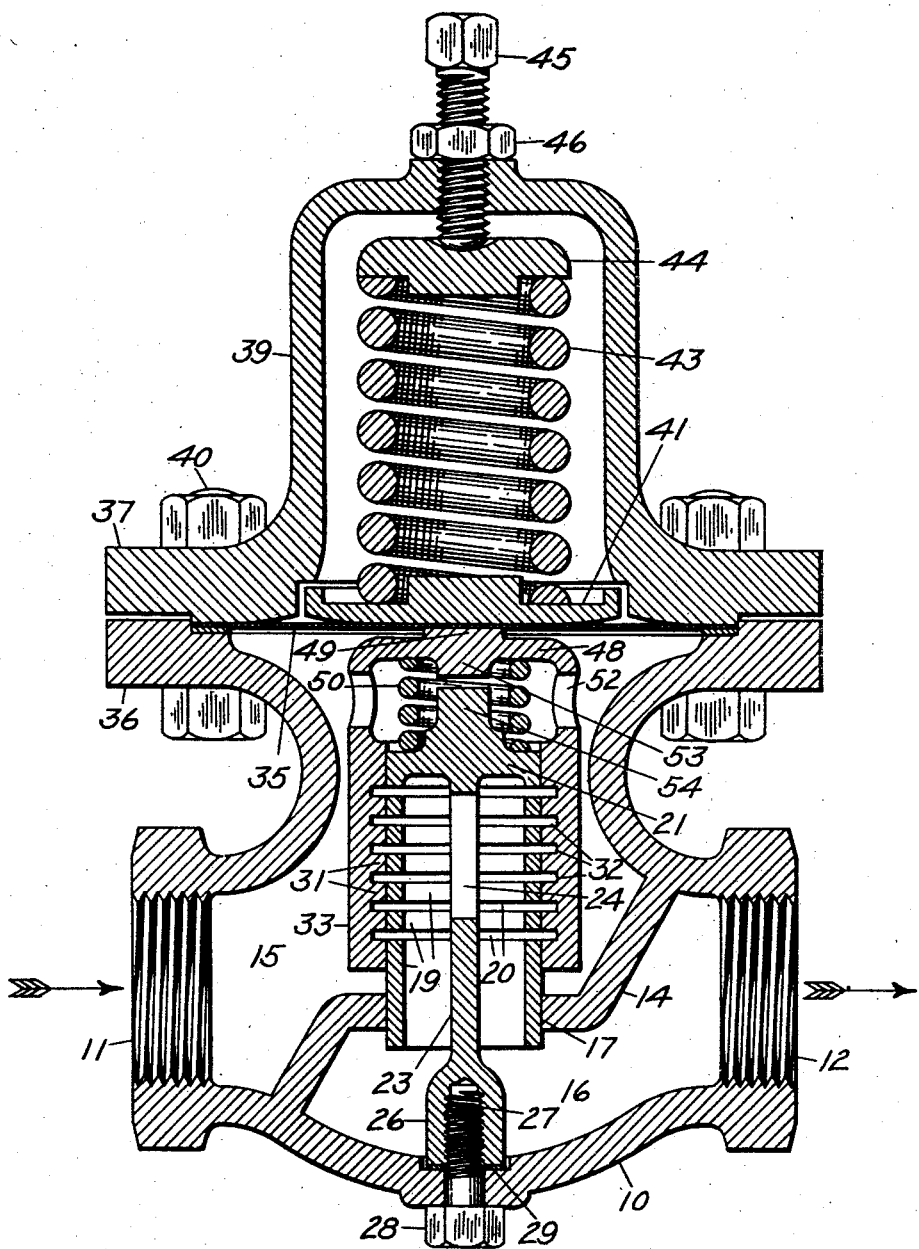

The embodiment illustrated in Fig. 1 comprises a hollow valve body portion or casing 10 provided with an inlet 11 and an outlet 12. Both the inlet and the outlet are screw-threaded internally in order that they may be conveniently connected to fluid conducting pipes. A partition 14 extends diagonally across the interior of the valve portion and divides the interior space into an inlet chamber 15 and an outlet chamber 16. The partition 14 is provided with a circular opening 17.

Figure 4:
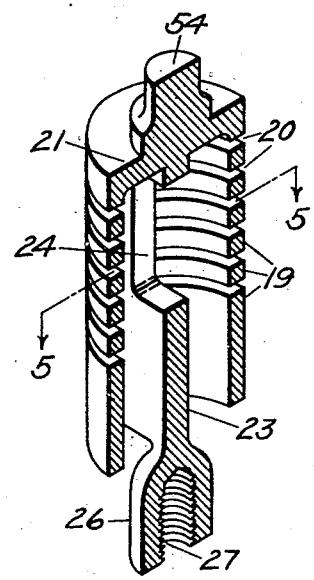
Fig. 4 is a perspective view of the inner valve member, shown in section on the line 4—4 of Fig. 5.
Figure 5:
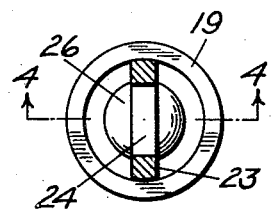
Fig. 5 is a section on the line 5—5 of Fig. 4.

In order to control the flow through the opening 17, I have shown a series of coaxial rings 19 which are spaced axially to provide annular ports or slots 20. These rings all have the same external diameter and form a cylindrical valve member. A coaxial disk 21 is located at one end of the series, and this disk has the same external diameter as the rings. In order to support the rings and disk and hold them in the proper relative positions, I provide a thin web 23 located inside the rings and integral with the rings and disk. An opening 24 may be provided in the web so that fluid may flow readily from one side of the web to the other. The construction of the rings and web is shown particularly in Figs. 4 and 5. It will be clear that various other shapes and arrangements of webs or ribs may be utilized to support the rings within the scope of the invention.

The rings 19 are supported in the inlet chamber and adjacent to the opening 17 to provide a valve seat, and in the embodiment illustrated the lowest ring, which is the last in the series at the end opposite to the disk 21, is located directly within the opening. The partition 14 fits this ring closely to form a fluid tight joint. With this construction, the fluid which enters the inlet 11 must pass through the annular ports 20 before it can reach the outlet 12. The outlet chamber 16 forms a conduit which connects directly with the interior of the rings 19. In order to hold the rings firmly in place, I have provided a boss 26 at the lower edge of the web 23, and this boss has a tapped hole 27. A cap screw 28 extends through the outer wall of the body portion 10 into this opening. A thin annular gasket 29 surrounds the screw 28 between the boss 26 and the wall, and serves to prevent external leakage of the fluid.

Figure 2:
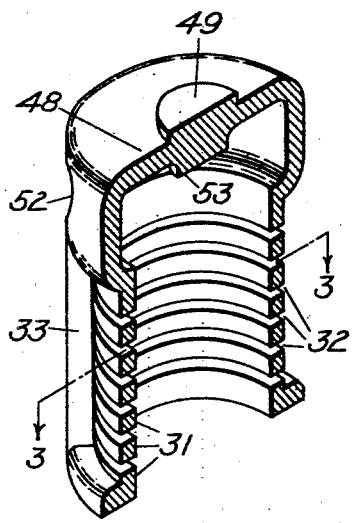
Fig. 2 is a perspective view of the outer valve member, shown in section on the line 2—2 of Fig. 3.
Figure 3:
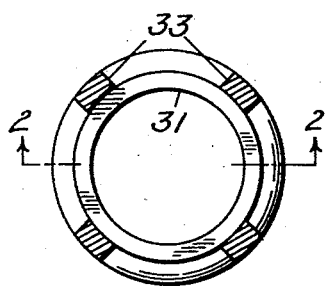
Fig. 3 is a section on the line 3—3 of Fig. 2.

I provide a second series of coaxial rings 31 mounted on the outside of the first series. These rings 31 are likewise spaced axially to provide annular ports or slots 32, and each ring 31 has an internal diameter equal to the external diameter of the rings 19. The rings 31 are supported in the proper relative positions by a suitable means such as a number of longitudinally extending ribs 33 (four being illustrated) located outside of and preferably integral with the rings. The construction of these rings and ribs is shown particularly in Figs. 2 and 3. The rings 31 thus form a slidable cylindrical valve member or sleeve which telescopes axially over and in contact with the stationary rings 19, so that the ports 32 may be brought into or out of register with the ports 20. The rings are at least as wide as the slots so that the valve may be completely closed.

The rings 31 are arranged to be moved automatically in accordance with the fluid pressure in the inlet chamber 15, so that this pressure may be held substantially constant. For this purpose I have shown a flexible diaphragm 35 having its lower surface exposed to the pressure in chamber 15. This diaphragm is clamped at its edge between a flange 36 on the body portion 10 and a flange 37 on a hollow spring casing 39. The flanges are held together by bolts 40. The diaphragm is supported against the fluid pressure by a circular pressure plate 41 which is held in contact with its upper surface by a coiled compression spring 43. The upper end of this spring is supported by a spring button 44. An adjusting screw 45 is threaded through the wall of the spring casing and supports the button 44 against the spring. By adjusting the screw 45, the spring pressure can be varied. A lock nut 46 holds the screw in any desired position.

The movements of the diaphragm 35 are imparted to the outer series of rings 31. For this purpose the uppermost of the rings 31 is extended upwardly and closed above the disk 21 by a disk 48 which has a boss 49 at the center of its upper surface. A small coiled compression spring 50 is located between the disks 21 and 48, and serves to hold the boss 49 in contact with the lower face of the diaphragm. Openings 52 are provided in the wall of the movable valve sleeve just beneath the disk 48 in order to equalize the fluid pressure on the sleeve. A small boss 53 is provided on the lower side of the disk 48 and a cooperating boss 54 is formed on the upper face of the disk 21. When there is no pressure in the inlet chamber 15, the spring 43 will force the outer rings 31 downwardly until the boss 53 strikes against boss 54, and these bosses are so proportioned that the annular ports 32 will be entirely out of register with the ports 20 and no flow can take place.

The operation of this embodiment of the invention will now be clear from the above disclosure. The inlet 11 and the outlet 12 are connected to pipes which conduct fluid under pressure, for example ammonia in a refrigerating system. The direction of flow is indicated by the arrows in Fig. 1. So long as the pressure in the inlet chamber 15 is at the desired value, the two sets of ports will remain in partial register, just sufficient to restrict the flow and maintain the pressure. If the inlet pressure increases, the diaphragm 35 and the rings 31 will move slightly upward, bringing the ports into better register and increasing the rate of flow until the desired pressure is restored. If the inlet pressure decreases, the diaphragm 35 and rings 31 will move slightly downward, thus restricting the flow still more and increasing the inlet pressure to its normal value. In Fig. 1 the valve is shown in its wide open position.

Since the ports 20 and 32 are effective throughout their entire circumference, and since they all start to open or close at the same time, a slight movement will produce a very large change in the area available for flow. The valve will therefore maintain a substantially constant inlet pressure in spite of a great variation in the rate of flow, and it will provide a very large effective port area if necessary to accommodate a flow of unusual magnitude. The movable valve parts are perfectly balanced against the fluid pressure and will move easily and freely in response to the slightest pressure change. There are no stuffing boxes or similar devices which might cause sticking and erratic operation.

The various parts are simple and inexpensive to manufacture. For example, the rings 19 can be first cast in the form of a sleeve without any ports, and the ports 20 can be easily and quickly cut in a lathe by means of a gang of "cut-off" or grooving tools working simultaneously on the outside of the sleeve. Similarly, the rings 31 may be cast in the form of a sleeve without any ports, and the ports 32 can be cut in a lathe by means of a gang of grooving tools working simultaneously on the inside of the sleeve. The outside of the rings 19 and the inside of the rings 31 are finished accurately to the same diameter. Assembly of the various parts is a simple matter, since there is nothing which requires accurate alignment.

Figure 6:
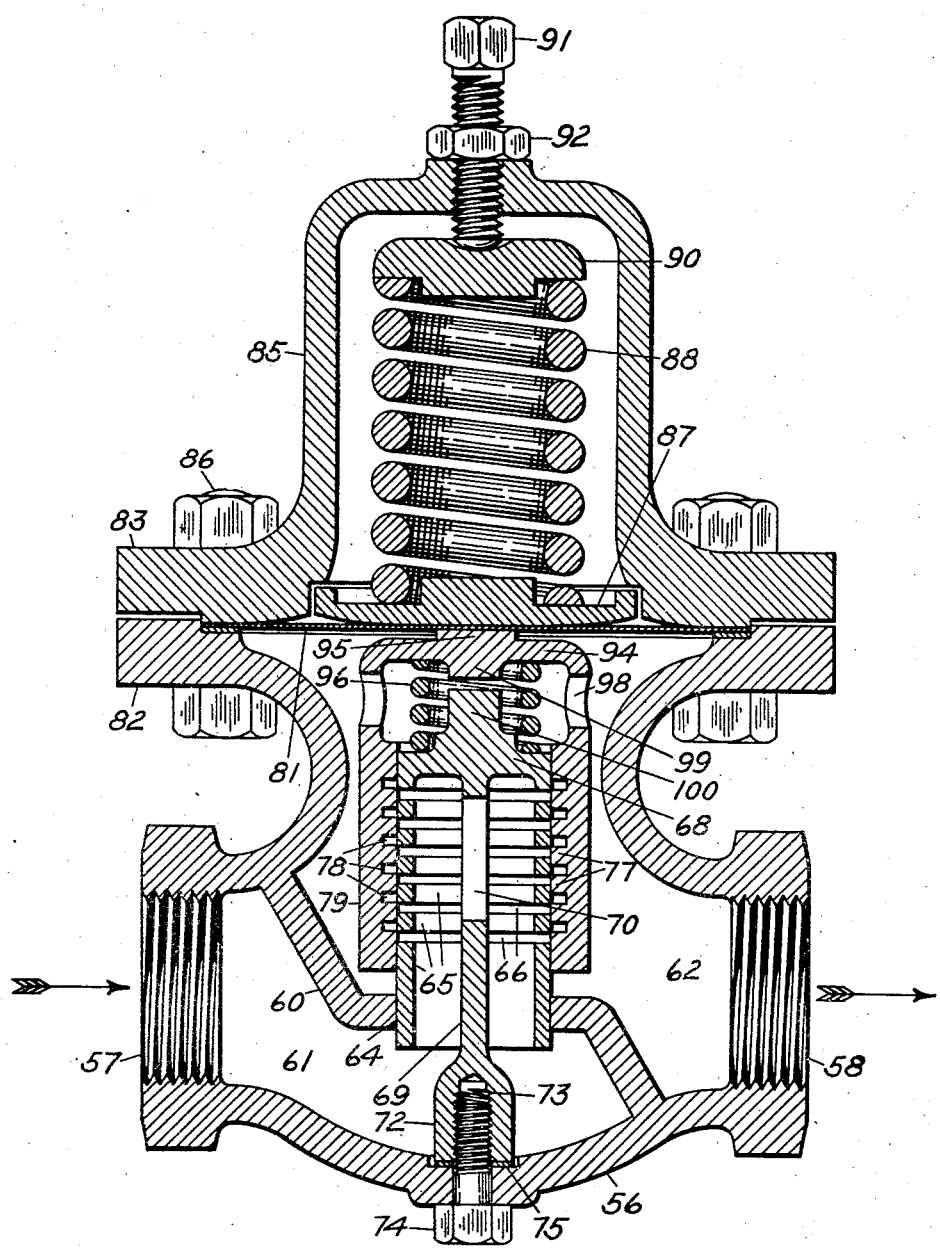
Fig. 6 is a section through a modified form of valve arranged to maintain automatically a substantially constant outlet pressure.

In Fig. 6 I have illustrated a slightly modified embodiment of the invention, arranged to maintain a substantially constant outlet pressure instead of a constant inlet pressure. This embodiment comprises a hollow body portion 56 having an inlet 57 and an outlet 58. The interior of the body 56 is divided by a diagonal partition 60 into an inlet chamber 61 and an outlet chamber 62. A circular opening 64 is provided in the partition.

Adjacent to the opening 64 I provide a series of coaxial rings 65 which are spaced axially to provide annular ports 66. A coaxial disk 68 is located at one end of the series. The disk and rings are all of the same external diameter, and they are supported from the inside by an integral web 69 having an opening 70 therethrough. The lowest ring, at the end of the series opposite to the disk 68, is located directly within the opening 64 and forms a tight joint with the partition 60. A boss 72 having a tapped hole 73 is located at the lower edge of the web 69 and fastened to the body portion by a cap screw 74, leakage being prevented by a gasket 75.

A second series of coaxial rings 77 is mounted on the outside of the first series. These rings are likewise spaced axially to provide annular ports 78, and the rings have an internal diameter equal to the external diameter of the rings 65. The rings 77 are supported by ribs 79 outside of and integral with the rings.

The rings 77 are arranged to be moved automatically in accordance with the fluid pressure at the discharge side of the valve, and for this purpose I have provided a flexible diaphragm 81 exposed on its lower surface to the pressure in outlet chamber 62. This diaphragm is clamped at its edge between a flange 82 on the body portion and a flange 83 on a spring casing 85, the flanges being held together by bolts 86. A circular pressure plate 87 is held in contact with the upper surface of the diaphragm by a coiled compression spring 88 which is supported at its upper end on a spring button 90. An adjusting screw 91 supports the button 90 and a lock nut 92 prevents accidental movement of the screw.

The movements of the diaphragm 81 are imparted to the outer series of rings 77. For this purpose the uppermost of the rings 77 is extended upwardly and closed above the disk 68 by a disk 94 having a boss 95 at the center of its upper surface, this boss being held against the lower face of the diaphragm by a small coiled compression spring 96. Openings 98 are provided in the wall of the movable valve sleeve just beneath the disk 94 to equalize the fluid pressure. A small boss 99 is provided on the lower side of the disk 94 and a cooperating boss 100 is formed on the upper face of the disk 68. When there is no pressure in the outlet chamber 62, the spring 88 will force the outer rings 77 downwardly until the boss 99 strikes against boss 100, and these bosses are so proportioned that the annular ports 78 will then be in complete register with the ports 66 and the valve will be wide open.

The operation of this embodiment will now be clear from the above disclosure. The inlet 57 and the outlet 58 are connected to pipes which conduct fluid under pressure, the direction of flow being indicated by the arrows. So long as the pressure in the outlet chamber 62 is at the desired value, the two sets of ports will remain in partial register just sufficient to restrict the flow and maintain the pressure. If the outlet pressure increases, the diaphragm 81 and the rings 77 will move slightly upward, bringing the ports into less complete register and decreasing the rate of flow until the desired pressure is restored. If the outlet pressure decreases, the diaphragm and rings will move slightly downward, thus bringing the ports into better register and increasing the rate of flow until the outlet pressure increases to its normal value. The valve is illustrated in its closed position.

Except for a slight change in the relative positions of the annular ports 66 and 78, the various parts of the valve shown in Fig. 6 may be exact duplicates of those shown in Fig. 1. The same advantages are realized of ease and simplicity of manufacture and assembly, large port area available with slight movement, and immediate response to small pressure changes.

Figure 7:
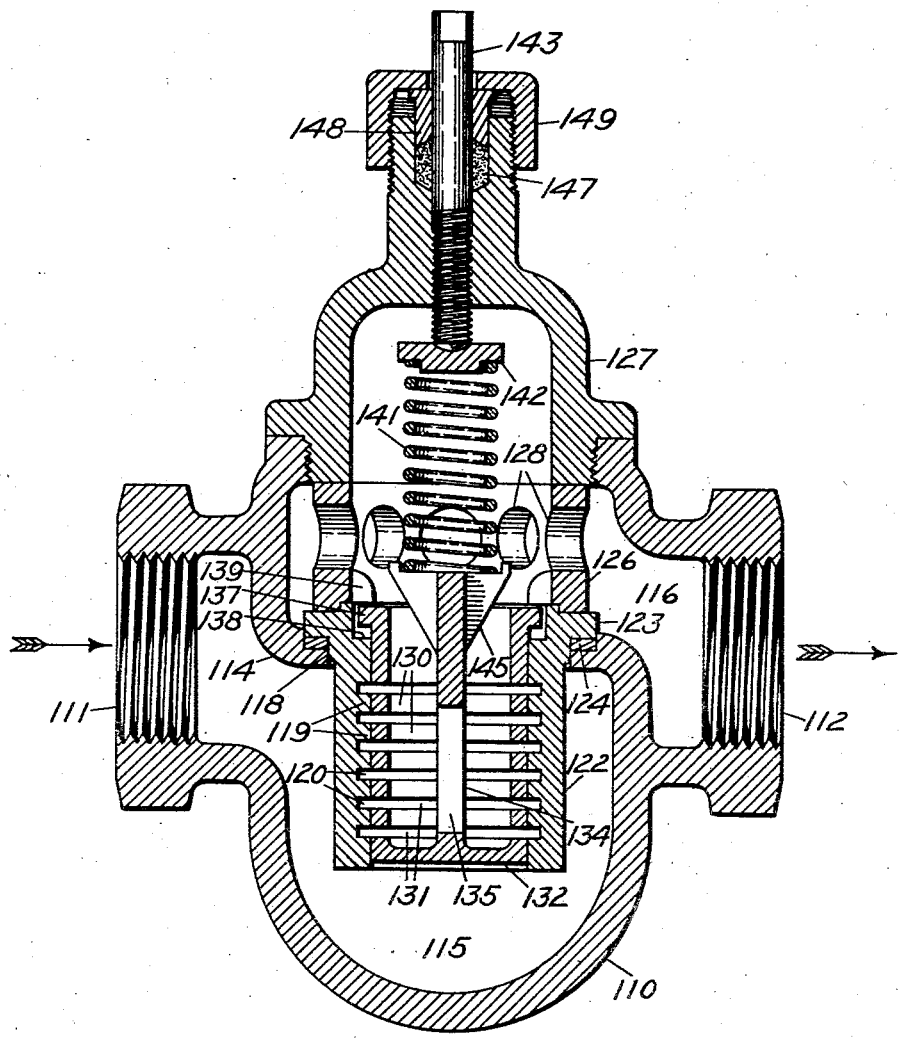
Fig. 7 is a section through a further modified form of valve arranged to maintain automatically a substantially constant differential pressure.

In Fig. 7 I have illustrated a still further embodiment of the invention, arranged to maintain a constant pressure differential between the valve inlet and outlet. This embodiment comprises a hollow body portion 110 having an inlet 111 and an outlet 112 which are screw-threaded internally for convenience in connecting to fluid conducting pipes. The interior of the body 110 is divided by a diagonal partition 114 into an inlet chamber 115 and an outlet chamber 116. A circular opening 118 is provided in the partition.

Adjacent to the opening 118 I provide a series of coaxial rings 119 which are spaced axially to provide annular ports 120. These rings are all of the same internal diameter and they are supported from the outside by longitudinally extending integral ribs 122. The uppermost of the rings 119 is mounted within the opening 118 and has an outwardly extending flange 123. An annular gasket 124 is placed between the flange 123 and the wall of the partition 118, and this gasket is compressed by a ring 126 which is forced against the top of the flange 123 by a cap or bonnet 127 screw-threaded to the body portion. Openings 128 are formed in the ring 126 to permit flow of fluid into the outlet chamber 116.

Inside of the rings 119 I provide a second series of coaxial rings 130 which are likewise spaced axially to provide annular ports 131. A disk 132 is provided at the lower end of the series. The disk and rings all have an external diameter equal to the internal diameter of the rings 119, and they are supported from the inside by an integral web 134 which may have an opening 135 therethrough. The rings 130 are arranged to slide axially to bring the ports 131 into or out of register with the ports 120. In order to limit their downward movement, I provide the uppermost of the rings 130 with an outwardly extending flange 137 which overhangs a shoulder 138 formed by counterboring the uppermost of the rings 119. At its lowest position the ports are fully closed. Upward movement is limited by lugs 139 projecting inwardly from the ring 126.

It will now be seen that the disk 132 is subject to a fluid pressure differential, since its lower surface is exposed to the pressure in the inlet chamber 115 and its upper surface is exposed to the pressure in the outlet chamber 116. The inlet pressure must always be the higher of the two, so long as flow is maintained. Hence the pressure differential tends to move the disk 132 and the rings 130 upwardly and thereby open the valve. In order to counteract this tendency I provide a coiled compression spring 141 having its lower end resting on the upper edge of web 134 and its upper end resting on a spring button 142 supported by a downwardly extending adjusting screw 143 threaded through the bonnet 127. Ribs 145 extending laterally from the upper edge of web 134 provide a suitable support for the spring and prevent it from slipping off the web.

In order to prevent external leakage of fluid past the screw 143, I provide packing 147 and a gland 148 surrounding the screw. A cap 149 is screw threaded to the bonnet 127 and serves to force the gland downwardly and compress the packing.

The operation of this embodiment will now be clear from the above disclosure. Pipes are connected to the inlet 111 and the outlet 112 to conduct fluid in the direction of the arrows. So long as the desired pressure difference exists between inlet chamber 115 and outlet chamber 116, the rings 130 will remain stationary, the ports 131 being in partial register with ports 120 to provide just the needed effective port area to maintain the desired conditions. If the pressure differential increases the rings 130 will move upwardly, increasing the effective port area until the rate of flow has increased sufficiently to restore normal differential. If the pressure differential decreases, the rings 130 will move downwardly, decreasing the effective port area until the rate of flow has decreased sufficiently to restore normal differential.

It will be seen that this embodiment has no flexible diaphragm, but operates the valve by the direct action of the fluid pressure on the movable valve member itself. Although a stuffing box is utilized, it is so arranged that it has no effect on the valve movement, and the rings 130 will slide freely at all times without sticking. Except for structural changes made necessary by the method of supporting and operating the valve rings 119 and 130, these parts are substantially the same as the corresponding parts in the other described embodiments. They can be manufactured in the same simple and inexpensive way, and they have the same advantages of providing very large variation in effective port area with slight valve movement.

Having thus described my invention, what I claim as new and desire to secure by Letters Patent is:

1. A flow controlling valve comprising a series of stationary coaxial rings which have the same external diameter, said rings being spaced axially to provide annular ports, a disk also of the same external diameter located at one end of the series, supporting means inside of the rings and integral with the rings and disk, a second series of coaxial rings mounted on the outside of the first rings, the rings of said second series being likewise spaced axially to provide annular ports and each having an internal diameter equal to the external diameter of the rings of the first series, supporting means outside of and integral with the rings of the second series, the second series of rings being slidable in an axial direction over the first series to bring the ports into or out of register, walls providing a conduit for fluid connecting with the interior of the first series of rings, and walls providing a conduit for fluid connecting with the exterior of the second series of rings.

2. A flow controlling valve comprising a hollow body portion having an inlet and an outlet, a partition dividing the interior of the body portion into an inlet chamber and an outlet chamber, said partition having an opening therein, a series of coaxial rings mounted adjacent to the opening, said rings all having the same internal diameter and being spaced axially to provide annular ports, supporting means outside of and integral with the rings, a second series of coaxial rings mounted on the inside of the first rings, the rings of said second series being likewise spaced axially to provide annular ports and each having an external diameter equal to the internal diameter of the rings of the first series, a disk also of the same external diameter located at the end of the second series, supporting means inside of the rings of the second series and integral with the rings and disk, the difference in fluid pressure between the inlet chamber and the outlet chamber being effective on the disk, and a spring tending to move the rings of the second series in opposition to said fluid pressure difference and thereby reduce the effective port area of the valve whenever said pressure difference decreases.

3. A flow controlling valve comprising a hollow body portion having an inlet and an outlet, a partition dividing the interior of the body portion into an inlet chamber and an outlet chamber, said partition having an opening therein, a series of coaxial rings mounted in the inlet chamber adjacent to said opening, said rings all having the same internal diameter and being spaced axially to provide annular ports, supporting means outside of and integral with the rings, a second series of coaxial rings mounted on the inside of the first rings, the rings of said second series being likewise spaced axially to provide annular ports and each having an external diameter equal to the internal diameter of the rings of the first series, a disk also of the same external diameter located at the end of the second series remote from the opening, supporting means inside of the rings of the second series and integral with the rings and disk, the difference in fluid pressure between the inlet chamber and the outlet chamber being effective on the disk, and a spring tending to move the rings of the second series in opposition to said fluid pressure difference and thereby reduce the effective port area of the valve whenever said pressure difference decreases.

CHARLES M. TERRY.